UNITED STATES PATENT OFFICE.

REVERE M. BREINIG, OF BROOKLYN, NEW YORK, ASSIGNOR TO LEONARD RICHARDSON, OF SAME PLACE.

IMPROVEMENT IN VARNISHES.

Specification forming part of Letters Patent No. 220,334, dated October 7, 1879; application filed July 16, 1879.

*To all whom it may concern:*

Be it known that I, REVERE M. BREINIG, of the city of Brooklyn, county of Kings, and State of New York, have invented a new and useful Article of Varnish; and hereby declare the following to be a clear and accurate description thereof, which will enable those skilled in the art to make the same.

One of the ingredients of my varnish is the metalline gum which was described and patented in certain Letters Patent of the United States reissued to Anna S. Breinig and others as assignees of David E. Breinig, No. 4,557, dated September 19, 1871, and which was prepared, as therein described, by taking fifty-six pounds of strong alkali, such as caustic soda or potash, dissolving it in forty-eight gallons of water, either by the aid of dry or of steam heat, and to this solution adding twenty-eight gallons of linseed-oil or cotton-seed oil, or of any drying oils, or their equivalents in fats. This mixture was then boiled until the ingredients were united into a soap. There was then taken nitrate of lead or copper, or sulphate of zinc, or any equivalent metallic salt in a solution of 24° Baumé; and this solution was mixed with the soap prepared, as above stated, in such proportion that the nitric or sulphuric acid of the metal salt would combine with the alkali of the soap, leaving the fatty acid of the soap combined with the metallic oxide (of zinc, lead, or copper) as the compound termed "metalline gum."

I have described the mode of preparing this metalline gum, as the same forms one of the principal ingredients of my present invention. I take ninety gallons of water, in which I dissolve, by steam or dry heat, about thirty pounds of caustic soda or potash, the former being preferable for my purpose. Next I take one hundred and fifty pounds of any resinous gum, such as resin, gum copal, or shellac, and this I melt by dry heat in fifteen gallons of linseed-oil, either raw or boiled, adding ten pounds of metalline gum, which I have above described.

The resinous gum and the metalline gum should be put into the linseed-oil at the same time and somewhat gradually, in order to more speedily and uniformly melt the resinous gum.

I have found by experiment that fifteen gallons of linseed-oil is about the proportions required for taking up the above-mentioned quantities of resinous gum. The quantity, however, of the metalline gum may be varied, depending upon the quality of the resinous gum, its age, and hardness, because where the gum is old and hard more of the metalline gum is required than when it is young and soft, the metalline gum being the active agent for dissolving the resinous gum, and the object being to thoroughly dissolve the latter and incorporate it with the oil.

The gum solution thus made I add to the alkaline solution above described, the former being added gradually, and the mixture being thoroughly stirred during the process, so that the saponification of the resinous gum and oil thus combined may take place as the mixing proceeds. I then boil the mixture until it becomes a homogeneous mass constituting a soap insoluble in water. It is then taken from the fire, and I add to it one hundred pounds of Liverpool salt, and I have found that the best results are obtained when the salt has been previously dissolved in about four buckets of water. After the salt has been added the mixture should be well stirred until all the free alkali is separated. It should then be filtered and pressed until as much as possible of the suspended or free alkali is got out, and the mass may then be put into a kettle and washed with pure cold water until it is thoroughly cleared of alkali matter. Several washings may be necessary, as the quality of the varnish very considerably depends upon its having been freed at this stage of the process from all alkaline impurities. After it has been thoroughly washed and the washing water poured off, I add fifty to sixty gallons of clear cold water, and boil until the whole is thoroughly united. I then take any one of the following metallic salts, ordinarily used as driers, namely, either a salt of lead, zinc, copper, aluminum, or manganese in a solution of 24° Baumé, for the purpose of precipitating the gum. Enough of the metallic salt should be used for the purpose, and I have found that 24° Baumé is about the proper test. The resulting gum is then washed in clear cold water three or four times until it is free from all acid. I then boil it by dry heat until it is clear and stringy, and draw it off the fire and add turpentine, naphtha, or any equivalent, as required, the former being preferable and producing better varnish.

What I claim as my invention, and desire to secure by Letters Patent, is—

The varnish compound herein described, consisting of metalline gum, caustic soda or potash, resinous gum, linseed-oil, chloride of sodium, turpentine, and a drier consisting of a metallic salt, as described, and in the proportions substantially as set forth.

In testimony whereof I have hereunto set my hand in the presence of two witnesses.

REVERE M. BREINIG.

Witnesses:
WM. A. JENNER,
J. H. IVES.